(12) United States Patent
Roetker

(10) Patent No.: US 11,473,232 B2
(45) Date of Patent: Oct. 18, 2022

(54) MOTOR ASSEMBLY FOR A WASHING MACHINE APPLIANCE

(71) Applicant: Haier US Appliance Solutions, Inc., Wilmington, DE (US)

(72) Inventor: John Joseph Roetker, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 44 days.

(21) Appl. No.: 17/115,954

(22) Filed: Dec. 9, 2020

(65) Prior Publication Data

US 2022/0178066 A1    Jun. 9, 2022

(51) Int. Cl.
| | |
|---|---|
| D06F 37/30 | (2020.01) |
| D06F 23/04 | (2006.01) |
| H02K 7/10 | (2006.01) |
| F04D 29/58 | (2006.01) |
| F04D 25/06 | (2006.01) |
| H02K 9/04 | (2006.01) |
| F16H 37/02 | (2006.01) |

(52) U.S. Cl.
CPC ............ *D06F 37/304* (2013.01); *D06F 23/04* (2013.01); *F04D 25/06* (2013.01); *F04D 29/584* (2013.01); *H02K 7/1004* (2013.01); *H02K 9/04* (2013.01); *F16H 37/02* (2013.01)

(58) Field of Classification Search
None
See application file for complete search history.

(56) References Cited

U.S. PATENT DOCUMENTS

| | | | |
|---|---|---|---|
| 6,435,828 B1 | 8/2002 | Bostwick | |
| 6,514,052 B2 | 2/2003 | Bostwick | |
| 10,612,556 B2 | 4/2020 | Conrad et al. | |
| 2008/0292464 A1* | 11/2008 | Keber | F04D 29/023 |
| | | | 416/185 |
| 2009/0184674 A1* | 7/2009 | Weinmann | D06F 37/304 |
| | | | 310/68 C |
| 2013/0055771 A1* | 3/2013 | Tashiro | D06F 37/304 |
| | | | 310/43 |

(Continued)

FOREIGN PATENT DOCUMENTS

| | | |
|---|---|---|
| CN | 104295526 A | 1/2015 |
| CN | 105937142 A | 9/2016 |

(Continued)

*Primary Examiner* — Cristi J Tate-Sims
(74) *Attorney, Agent, or Firm* — Dority & Manning, P.A.

(57) ABSTRACT

A washing machine appliance includes a wash basket rotatably mounted within a wash tub for receiving of a load of articles for washing. A motor assembly is operably coupled to the wash basket and an agitation element for selectively rotating the wash basket and the agitation element and includes a drive motor having a motor shaft defining an axial direction, a transmission assembly operably coupled to the wash basket for transmitting torque from the motor shaft to the wash basket and the agitation element and the agitation element, and a cooling fan mechanically coupled to the motor shaft for urging a flow of air as the drive motor rotates the motor shaft, the cooling fan comprising a plurality of blades, wherein the plurality of blades have a geometry that varies along the axial direction to follow a contour of an external surface of the drive motor.

20 Claims, 6 Drawing Sheets

(56) References Cited

U.S. PATENT DOCUMENTS

2014/0377071 A1* 12/2014 Kim ..................... F04D 29/30
      416/185

FOREIGN PATENT DOCUMENTS

| KR | 101147740 B1 | 5/2012 |
|----|--------------|--------|
| WO | WO2006/013067 A2 | 2/2006 |
| WO | WO2009/070599 A1 | 6/2009 |

* cited by examiner

MOTOR ASSEMBLY FOR A WASHING MACHINE APPLIANCE

FIELD OF THE INVENTION

The present subject matter relates generally to washing machine appliances, and more particularly to motor assemblies for washing machine appliances.

BACKGROUND OF THE INVENTION

Washing machine appliances generally include a wash tub for containing water or wash fluid, e.g., water and detergent, bleach, and/or other wash additives. A wash basket is rotatably mounted within the wash tub and defines a wash chamber for receipt of articles for washing, and an agitation element is rotatably mounted within the wash basket. Washing machine appliances are typically equipped to operate in one or more modes or cycles, such as wash, rinse, and spin cycles. For example, during a wash or rinse cycle, the wash fluid is directed into the wash tub in order to wash and/or rinse articles within the wash chamber. In addition, the wash basket and/or the agitation element can rotate at various speeds to agitate or impart motion to articles within the wash chamber, to wring wash fluid from the articles, etc.

To facilitate rotation of the wash basket during the various operating cycles, conventional washing machine appliances include a motor assembly that is mechanically coupled to the wash basket. Notably, the performance of conventional operating cycles may be limited due to temperature restrictions related to drive motor or other components of the motor assembly. In this regard, conventional motor assemblies typically generate significant heat during operation, necessitating the implementation of cool-down periods, performance of cycles at reduced speeds, or other heat mitigation steps or procedures.

Accordingly, a washing machine appliance including features for improved and prolonged operation of a motor assembly would be useful. More specifically, a motor assembly for a washing machine appliance that includes integral features for facilitating the cooling of the motor, e.g., to maximize the operating envelope of the motor without requiring costly heat mitigation techniques, would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a washing machine appliance is provided including a cabinet, a wash tub positioned within the cabinet and defining a wash chamber, a wash basket rotatably mounted within the wash tub for receiving of a load of articles for washing, an agitation element rotatably mounted within the wash basket, and a motor assembly operably coupled to the wash basket and the agitation element for selectively rotating the wash basket and the agitation element. The motor assembly includes a drive motor having a motor shaft defining an axial direction, a transmission assembly operably coupled to the wash basket and the agitation element for transmitting torque from the motor shaft to the wash basket and the agitation element, and a cooling fan mechanically coupled to the motor shaft for urging a flow of air as the drive motor rotates the motor shaft, the cooling fan including a plurality of blades, wherein the plurality of blades have a geometry that varies along the axial direction to follow a contour of an external surface of the drive motor.

In another exemplary embodiment, a motor assembly for a washing machine appliance is provided. The washing machine appliance includes a wash basket rotatably mounted within the wash tub for receiving of a load of articles for washing and an agitation element rotatably mounted within the wash basket. The motor assembly includes a drive motor having a motor shaft defining an axial direction, a transmission assembly operably coupled to the wash basket and the agitation element for transmitting torque from the motor shaft to the wash basket and the agitation element, and a cooling fan mechanically coupled to the motor shaft for urging a flow of air as the drive motor rotates the motor shaft, the cooling fan including a plurality of blades, wherein the plurality of blades have a geometry that varies along the axial direction to follow a contour of an external surface of the drive motor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
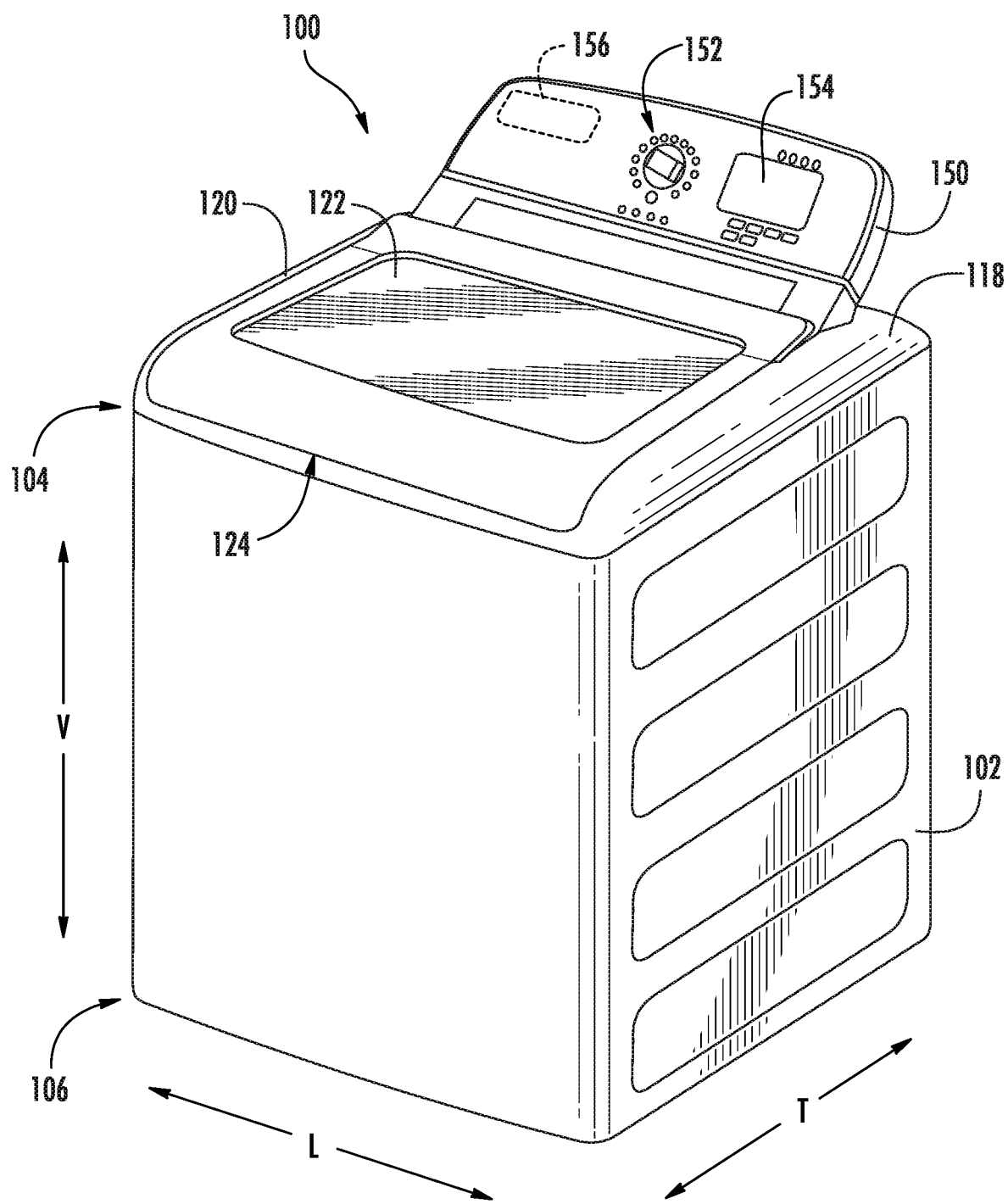
FIG. 1 provides a perspective view of a washing machine appliance according to an exemplary embodiment of the present subject matter with a door of the exemplary washing machine appliance shown in a closed position.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows. The terms "includes" and "including" are intended to be inclusive in a manner similar to the term "comprising." Similarly, the term "or" is generally intended to be inclusive (i.e., "A or B" is intended to mean "A or B or both").

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a 10 percent margin.

Figure 2:
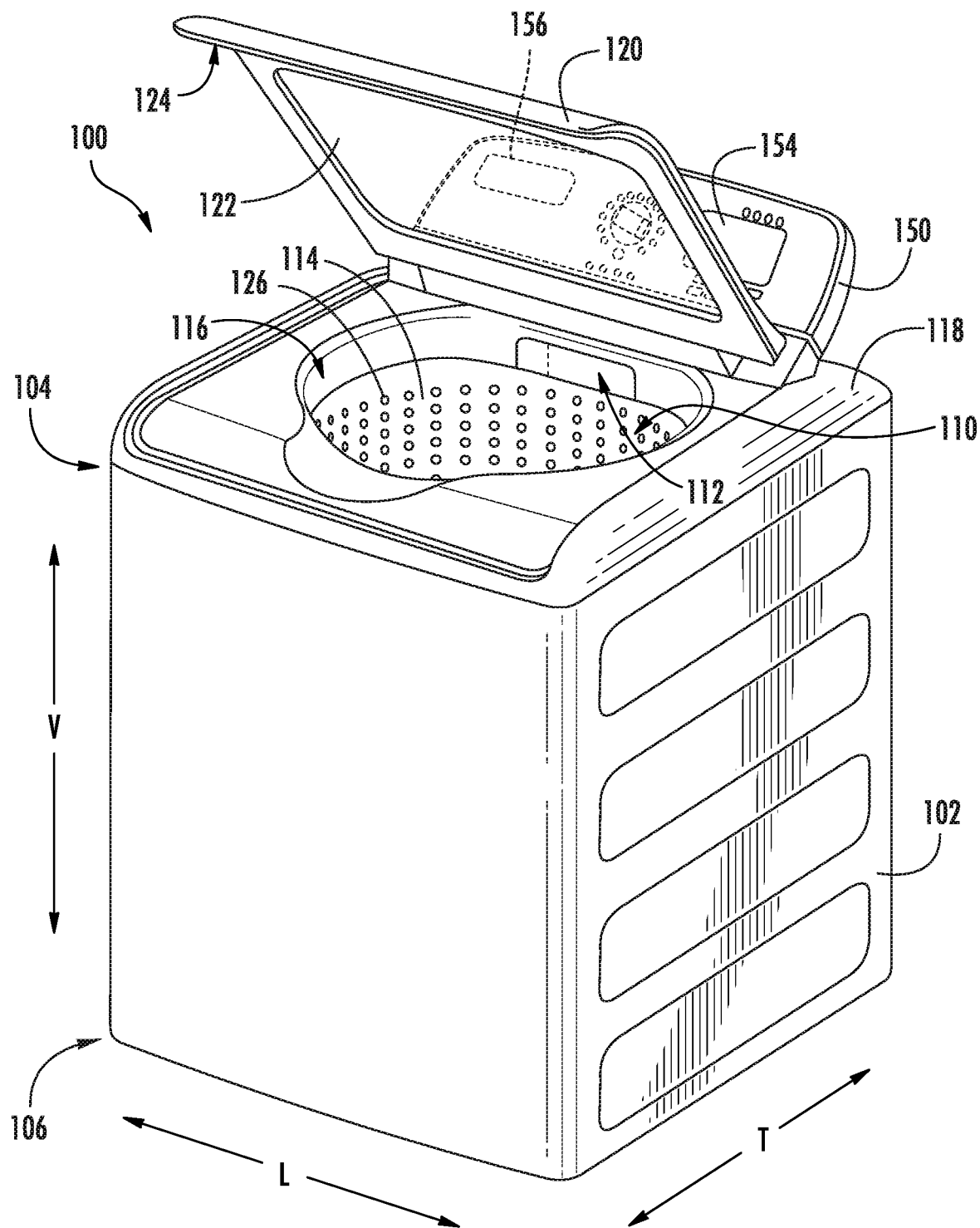
FIG. 2 provides a perspective view of the exemplary washing machine appliance of FIG. 1 with the door of the exemplary washing machine appliance shown in an open position.
Figure 3:
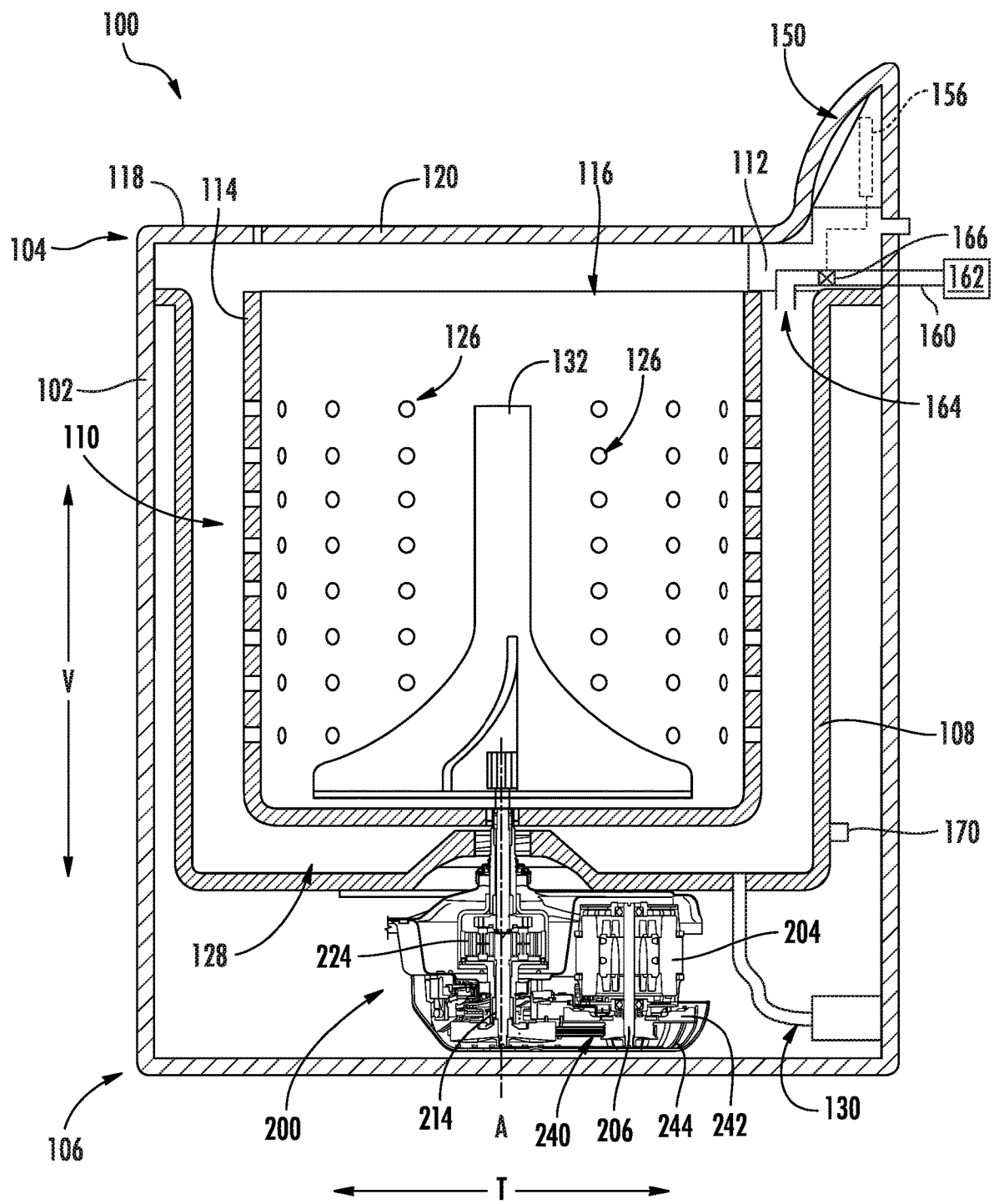
FIG. 3 provides a side cross-sectional view of the exemplary washing machine appliance of FIG. 1.

FIGS. 1 through 3 illustrate an exemplary embodiment of a vertical axis washing machine appliance 100. Specifically, FIGS. 1 and 2 illustrate perspective views of washing machine appliance 100 in a closed and an open position, respectively. FIG. 3 provides a side cross-sectional view of washing machine appliance 100. Washing machine appliance 100 generally defines a vertical direction V, a lateral direction L, and a transverse direction T, each of which is mutually perpendicular, such that an orthogonal coordinate system is generally defined.

While described in the context of a specific embodiment of vertical axis washing machine appliance 100, it should be appreciated that vertical axis washing machine appliance 100 is provided by way of example only. It will be understood that aspects of the present subject matter may be used in any other suitable washing machine appliance, such as a horizontal axis washing machine appliance. Indeed, modifications and variations may be made to washing machine appliance 100, including different configurations, different appearances, and/or different features while remaining within the scope of the present subject matter.

Washing machine appliance 100 has a cabinet 102 that extends between a top portion 104 and a bottom portion 106 along the vertical direction V, between a first side (left) and a second side (right) along the lateral direction L, and between a front and a rear along the transverse direction T. As best shown in FIG. 3, a wash tub 108 is positioned within cabinet 102, defines a wash chamber 110, and is generally configured for retaining wash fluids during an operating cycle. Washing machine appliance 100 further includes a primary dispenser 112 (FIG. 2) for dispensing wash fluid into wash tub 108. The term "wash fluid" refers to a liquid used for washing and/or rinsing articles during an operating cycle and may include any combination of water, detergent, fabric softener, bleach, and other wash additives or treatments.

In addition, washing machine appliance 100 includes a wash basket 114 that is positioned within wash tub 108 and generally defines an opening 116 for receipt of articles for washing. More specifically, wash basket 114 is rotatably mounted within wash tub 108 such that it is rotatable about an axis of rotation A. According to the illustrated embodiment, the axis of rotation A is substantially parallel to the vertical direction V. In this regard, washing machine appliance 100 is generally referred to as a "vertical axis" or "top load" washing machine appliance 100. However, it should be appreciated that aspects of the present subject matter may be used within the context of a horizontal axis or front load washing machine appliance as well.

As illustrated, cabinet 102 of washing machine appliance 100 has a top panel 118. Top panel 118 defines an opening (FIG. 2) that coincides with opening 116 of wash basket 114 to permit a user access to wash basket 114. Washing machine appliance 100 further includes a door 120 which is rotatably mounted to top panel 118 to permit selective access to opening 116. In particular, door 120 selectively rotates between the closed position (as shown in FIGS. 1 and 3) and the open position (as shown in FIG. 2). In the closed position, door 120 inhibits access to wash basket 114. Conversely, in the open position, a user can access wash basket 114. A window 122 in door 120 permits viewing of wash basket 114 when door 120 is in the closed position, e.g., during operation of washing machine appliance 100. Door 120 also includes a handle 124 that, e.g., a user may pull and/or lift when opening and closing door 120. Further, although door 120 is illustrated as mounted to top panel 118, door 120 may alternatively be mounted to cabinet 102 or any other suitable support.

As best shown in FIGS. 2 and 3, wash basket 114 further defines a plurality of perforations 126 to facilitate fluid communication between an interior of wash basket 114 and wash tub 108. In this regard, wash basket 114 is spaced apart from wash tub 108 to define a space for wash fluid to escape wash chamber 110. During a spin cycle, wash fluid within articles of clothing and within wash chamber 110 is urged through perforations 126 wherein it may collect in a sump 128 defined by wash tub 108. Washing machine appliance 100 further includes a pump assembly 130 (FIG. 3) that is located beneath wash tub 108 and wash basket 114 for gravity assisted flow when draining wash tub 108.

An impeller or agitation element 132 (FIG. 3), such as a vane agitator, impeller, auger, oscillatory basket mechanism, or some combination thereof is disposed in wash basket 114 to impart an oscillatory motion to articles and liquid in wash basket 114. More specifically, agitation element 132 extends into wash basket 114 and assists agitation of articles disposed within wash basket 114 during operation of washing machine appliance 100, e.g., to facilitate improved cleaning. In different embodiments, agitation element 132 includes a single action element (i.e., oscillatory only), a double action element (oscillatory movement at one end, single direction rotation at the other end) or a triple action element (oscillatory movement plus single direction rotation at one end, single direction rotation at the other end). As illustrated in FIG. 3, agitation element 132 and wash basket 114 are oriented to rotate about axis of rotation A (which is substantially parallel to vertical direction V).

As best illustrated in FIG. 3, washing machine appliance 100 includes a motor assembly 200 (described in detail below) in mechanical communication with wash basket 114 to selectively rotate wash basket 114 (e.g., during an agitation or a rinse cycle of washing machine appliance 100). In addition, motor assembly 200 may also be in mechanical communication with agitation element 132. In this manner, motor assembly 200 may be configured for selectively rotating or oscillating wash basket 114 and/or agitation element 132 during various operating cycles of washing machine appliance 100.

Referring still to FIGS. 1 through 3, a control panel 150 with at least one input selector 152 (FIG. 1) extends from top panel 118. Control panel 150 and input selector 152 collectively form a user interface input for operator selection of machine cycles and features. A display 154 of control panel 150 indicates selected features, operation mode, a countdown timer, and/or other items of interest to appliance users regarding operation.

Operation of washing machine appliance 100 is controlled by a controller or processing device 156 that is operatively coupled to control panel 150 for user manipulation to select washing machine cycles and features. In response to user manipulation of control panel 150, controller 156 operates the various components of washing machine appliance 100 to execute selected machine cycles and features. According to an exemplary embodiment, controller 156 may include a memory and microprocessor, such as a general or special purpose microprocessor operable to execute programming instructions or micro-control code associated with methods described herein. Alternatively, controller 156 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software. Control panel 150 and other components of washing machine appliance 100 may be in communication with controller 156 via one or more signal lines or shared communication busses.

During operation of washing machine appliance 100, laundry items are loaded into wash basket 114 through opening 116, and washing operation is initiated through operator manipulation of input selectors 152. Wash basket 114 is filled with water and detergent and/or other fluid additives via primary dispenser 112. One or more valves can be controlled by washing machine appliance 100 to provide for filling wash tub 108 and wash basket 114 to the appropriate level for the amount of articles being washed and/or rinsed. By way of example for a wash mode, once wash basket 114 is properly filled with fluid, the contents of wash basket 114 can be agitated (e.g., with agitation element 132 as discussed previously) for washing of laundry items in wash basket 114.

More specifically, referring again to FIG. 3, a water fill process will be described according to an exemplary embodiment. As illustrated, washing machine appliance 100 includes a water supply conduit 160 that provides fluid communication between a water supply source 162 (such as a municipal water supply) and a discharge nozzle 164 for directing a flow of water into wash chamber 110. In addition, washing machine appliance 100 includes a water fill valve or water control valve 166 which is operably coupled to water supply conduit 160 and communicatively coupled to controller 156. In this manner, controller 156 may regulate the operation of water control valve 166 to regulate the amount of water within wash tub 108. In addition, washing machine appliance 100 may include one or more pressure sensors 170 for detecting the amount of water and or clothes within wash tub 108. For example, pressure sensor 170 may be operably coupled to a side of tub 108 for detecting the weight of wash tub 108, which controller 156 may use to determine a volume of water in wash chamber 110 and a subwasher load weight.

After wash tub 108 is filled and the agitation phase of the wash cycle is completed, wash basket 114 can be drained, e.g., by drain pump assembly 130. Laundry articles can then be rinsed by again adding fluid to wash basket 114 depending on the specifics of the cleaning cycle selected by a user. The impeller or agitation element 132 may again provide agitation within wash basket 114. One or more spin cycles may also be used as part of the cleaning process. In particular, a spin cycle may be applied after the wash cycle and/or after the rinse cycle in order to wring wash fluid from the articles being washed. During a spin cycle, wash basket 114 is rotated at relatively high speeds to help wring fluid from the laundry articles through perforations 126. After articles disposed in wash basket 114 are cleaned and/or washed, the user can remove the articles from wash basket 114, e.g., by reaching into wash basket 114 through opening 116.

Figure 4:
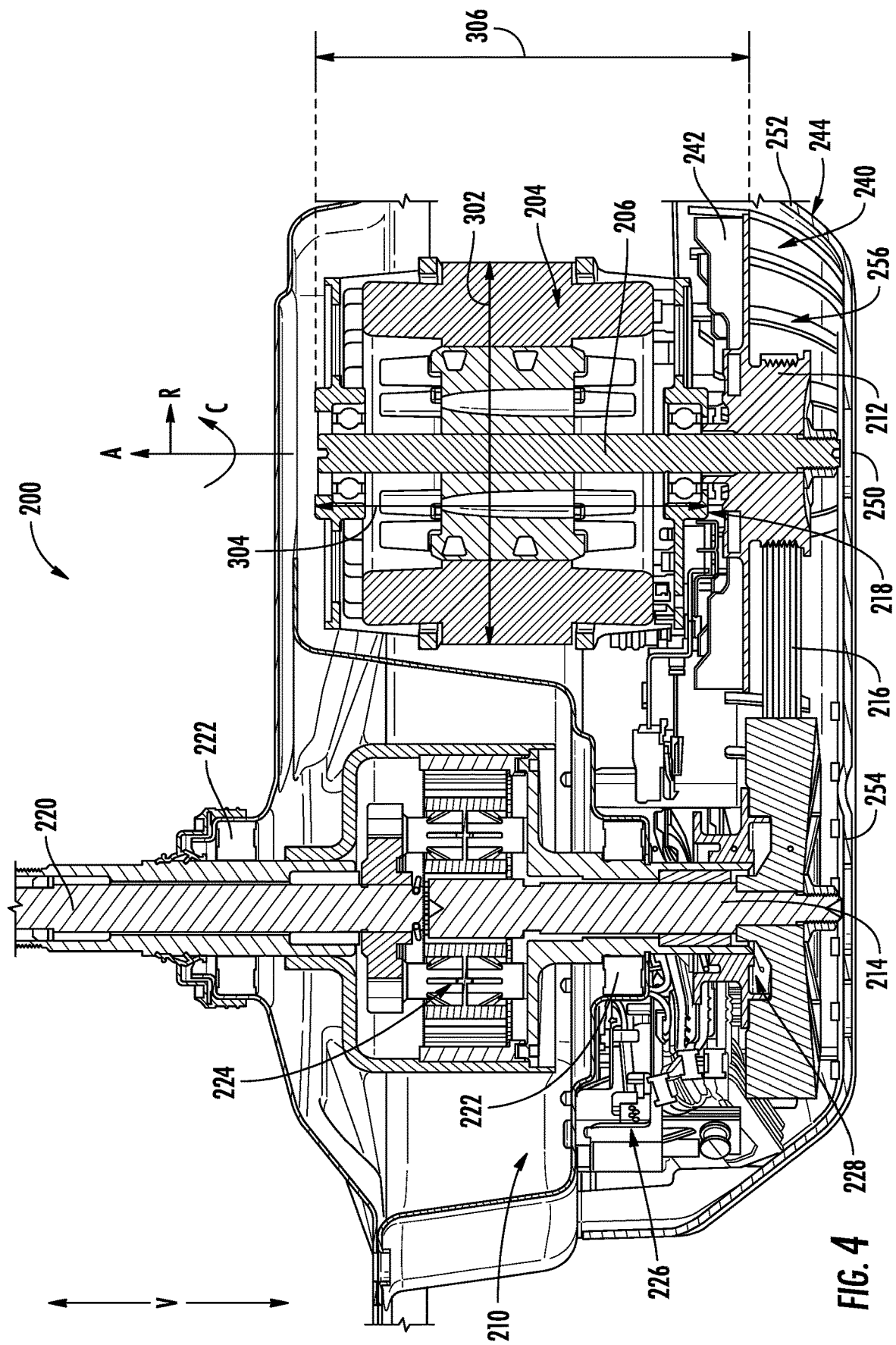
FIG. 4 provides a cross-sectional view of a motor assembly that may be used with the exemplary washing machine appliance of FIG. 1 according to an exemplary embodiment of the present subject matter.
Figure 5:
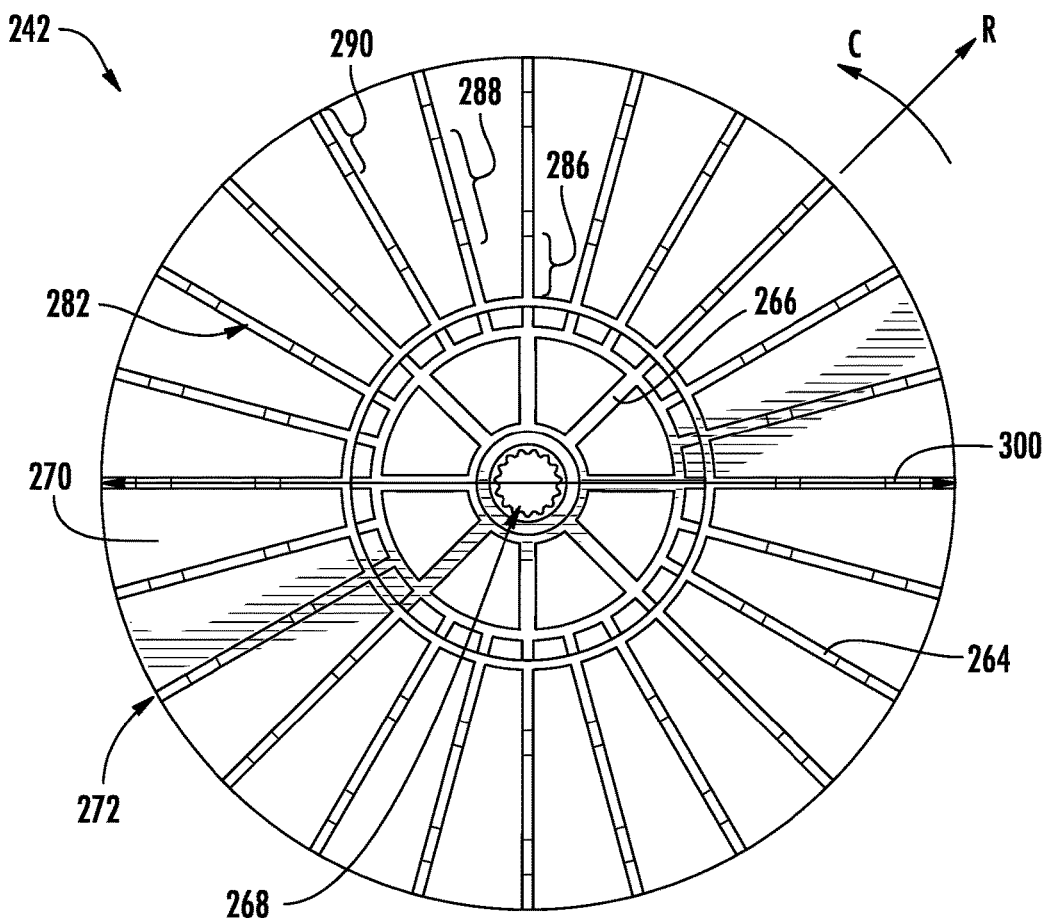
FIG. 5 provides a top view of a cooling fan that may be used with the exemplary motor assembly of FIG. 4 according to an exemplary embodiment of the present subject matter.
Figure 6:
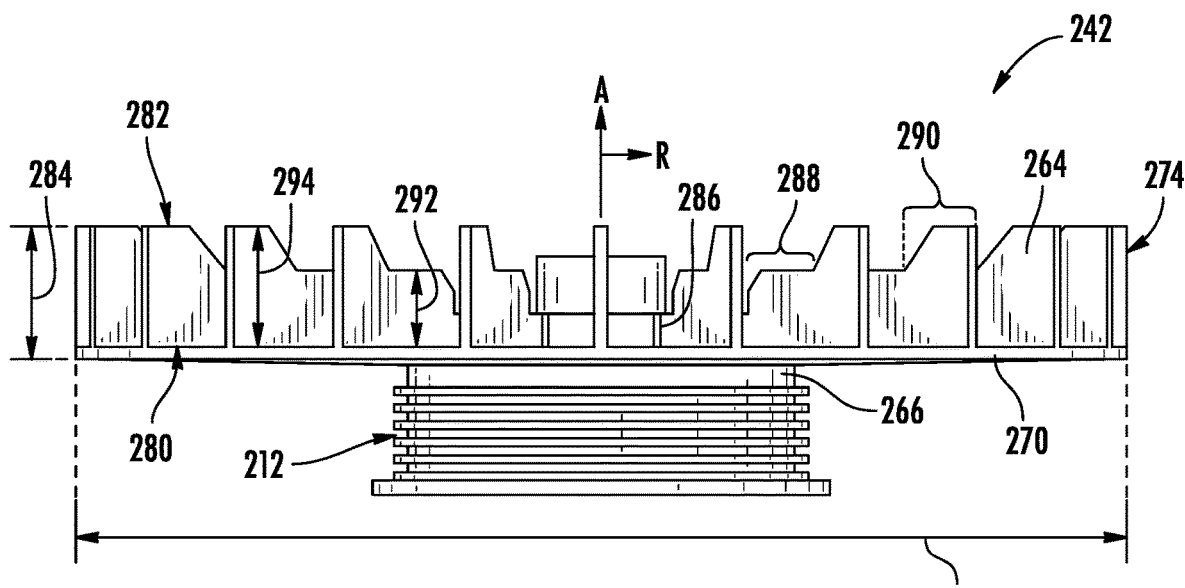
FIG. 6 provides a side view of the exemplary cooling fan of FIG. 5 according to an exemplary embodiment of the present subject matter.

Referring now to FIGS. 3 and 4, a motor assembly 200 will be described according to an exemplary embodiment of the present subject matter. Motor assembly 200 may be used with washing machine appliance 100, e.g., to facilitate rotation of wash basket 114 and/or agitation element 132, as described above. In addition, motor assembly 200 may be used in other washing machine appliances, including both vertical and horizontal axis washing machine appliances. As described in detail below, motor assembly 200 includes features for rotating wash basket 114 while also generating a flow of cooling air to help reduce the operating temperature of motor assembly 200, thereby expanding its overall operating envelope and performance capabilities. It should be appreciated that motor assembly 200 described herein is only an exemplary embodiment used to describe aspects of the present subject matter and is not intended to limit the scope of the present disclosure in any manner.

As shown, motor assembly 200 generally includes a drive motor 204 that is operably coupled to wash basket 114 for selectively rotating wash basket 114. More specifically, for example, drive motor 204 may include a motor shaft 206 that defines an axial direction A, a radial direction R, and a circumferential direction C. According to the exemplary embodiment, drive motor 204 is a vertically oriented, e.g., such that motor shaft 206 extends parallel to the vertical direction V of washing machine appliance 100 (i.e., such that axial direction A is parallel to the vertical direction V). However, it should be appreciated that aspects of the present subject matter may apply to any other suitable motor arrangement, e.g., such as a horizontally mounted motor assembly for a front load washing machine appliance.

As used herein, "motor" may refer to any suitable drive motor and/or transmission assembly for rotating wash basket 114. For example, drive motor 204 may be a brushless DC electric motor, a stepper motor, or any other suitable type or configuration of motor. For example, drive motor 204 may be an AC motor, an induction motor, a permanent magnet synchronous motor, or any other suitable type of AC motor. In addition, drive motor 204 may include any suitable transmission assemblies, clutch mechanisms, or other components. According to an exemplary embodiment, drive motor 204 may be operably coupled to controller 156, which is programmed to rotate wash basket 114 according to predetermined operating cycles, based on user inputs (e.g. via control panel 150 or input selectors 152), etc.

Motor assembly 200 may further include a transmission assembly 210 that is operably coupled to wash basket 114 and/or agitation element 132 for transmitting torque from motor shaft 206. In general, transmission assembly 210 may be any suitable mechanism or device suitable for utilizing the rotational motion of motor shaft 206 to rotate wash basket 114 and/or agitation element 132. Accordingly, aspects of the present subject matter are not limited to the specific transmission assembly 210 described herein according to an exemplary embodiment.

Specifically, as best shown in FIG. 4, transmission assembly 210 is a belt driven transmission. In this regard, transmission assembly 210 includes a drive pulley 212 that is directly mechanically coupled to motor shaft 206. Drive pulley 212 is generally configured for transmitting torque to an input shaft 214 of transmission assembly 210 via a drive belt 216. As shown, input shaft 214 and motor shaft 206 are both vertically oriented in parallel to each other. In addition, motor shaft 206 and drive pulley 212 both extend out of a bottom surface 218 of drive motor 204 and input shaft 214 extends from a bottom of wash basket 114 to a location proximate bottom 106 of cabinet 102. However, it should be appreciated that according to alternative embodiments, any other suitable motor and transmission configuration may be used.

Referring still to FIG. 4, input shaft 214 may be mechanically coupled to an output shaft 220 that is coupled to wash basket 114 and/or agitation element 132. More specifically, as shown, input shaft 214 and output shaft 220 are rotatably supported by one or more bearings 222 and are mechanically coupled through a gearbox 224, a mode shifter 226, and a clutch 228. In general, gearbox 224 includes a plurality of gears encased in a housing for altering the torque and/or speed transmitted from input shaft 214 to output shaft 220. In addition, mode shifter 226 may be any suitable mechanism, gear train, etc. that is generally configured for adjusting the rotating action of output shaft 220, e.g., to facilitate various agitation profiles or programs depending on the operating cycle of washing machine appliance 100. Clutch 228 may be any suitable device for selectively engaging or disengaging input shaft 214 and output shaft 220, e.g., for engaging and disengaging wash basket 114 and/or agitation element 132.

Notably, motor assembly 200 and transmission assembly 210 may operate together to facilitate multiple modes of operation of washing machine appliance 100. For example, during a wash cycle or an agitation cycle, wash basket 114 may remain stationary and agitation element 132 may oscillate back and forth according to any suitable agitation profile. This may be achieved, for example, by disengaging mode shifter 226 and/or clutch 228 to mechanically decouple wash basket 114 from drive belt 216 while operating drive motor 204 in a bi-directional, oscillating manner. By contrast, during a drain cycle or a spin cycle, wash basket 114 and agitation element 132 may rotate in the same direction at high speeds. This may be achieved, for example, by engaging mode shifter 226 and/or clutch 228 to mechanically couple wash basket 114 to drive belt 216 while operating drive motor 204 in a single direction. It should be appreciated that other modes of operating, along with other means for transmitting torque from motor assembly 200 may be used while remaining within the scope of the present subject matter.

Notably, operation of drive motor 204 generates heat within cabinet 102. If this heat exceeds certain thresholds and is not discharged away from drive motor 204, the operating limits of drive motor 204 may result in restrictions on the performance capabilities and operating envelope of motor assembly 200. As a result, aspects of the present subject matter are directed to systems and features for facilitating cooling of motor assembly 200, e.g., thereby facilitating improved performance of motor assembly 200 and washing machine appliance 100.

Specifically, according to exemplary embodiments of the present subject matter, washing machine appliance 100 may include a fan assembly 240 that is generally configured for cooling drive motor 204 during operation of washing machine appliance 100. More specifically, referring still to FIG. 4, fan assembly 240 may generally include a cooling fan 242 that is mechanically coupled to motor shaft 206 for urging a flow of cooling air around drive motor 204 as it rotates motor shaft 206. In addition, fan assembly 240 may include a fan housing or a fan cover 244 that is positioned over cooling fan 242 and is generally configured for preventing access to moving parts of drive motor 204 and/or fan assembly 240. Each of these features of fan assembly 240 will be described in more detail below according to exemplary embodiments of the present subject matter.

In general, cooling fan 242 may generally be any suitable type and configuration of fan or other air moving device. For example, cooling fan 242 is illustrated as a centrifugal fan directly coupled to motor shaft 206 such that it rotates about the axial direction A. However, according to alternative embodiments, cooling fans 242 may be a tangential fan, an axial fan, or any other suitable air blower. Notably, regardless of the type and configuration of fan used, the space available within cabinet 102 for positioning and rotating cooling fan 242 is very limited. Therefore, aspects of the present subject matter are directed to unique designs of fan assembly 240 to facilitate improved cooling of the motor assembly 200 during operation.

Referring now specifically to FIG. 4, fan assembly 240 may include a fan cover 244 that generally includes an endcap 250 that is positioned opposite cooling fan 242 relative to drive motor 204 along the axial direction A. In other words, endcap 250 is generally a flat portion of fan cover 244 and cooling fan 242 is sandwiched between drive motor 204 and endcap 250. Fan cover 244 further includes a peripheral portion 252 that extends from endcap 250 and wraps around a radial tip of cooling fan 242, e.g., to prevent user access to moving parts of drive motor 204 or cooling fan 242 during operation.

According to the illustrated embodiment, fan cover 244 is designed not only to cover cooling fan 242, but also to cover other portions of transmission assembly 210. In this regard, for example, fan cover 244 may further define a belt cover 254 that extends from fan cover 244 is positioned over drive belt 216, mode shifter 226, clutch 228, etc. Notably, to facilitate the discharge of air flow generated by cooling fan 242, fan cover 244 and belt cover 254 may define a plurality of apertures. Specifically, according to the illustrated embodiment, fan cover 244 may define a plurality of ventilation apertures 256 and belt cover 254 may define a plurality of belt cover apertures 256 for passing the flow of cooling air. In general, fan cover 244 and belt cover 254 may define any suitable number, type, geometry, size, and configuration of apertures 256 for facilitating improved airflow from fan assembly 240.

For example, according to the illustrated embodiment, a plurality of smaller ventilation apertures 256 may be spaced in a circular pattern on endcap 250, e.g., surrounding motor shaft 206. Moreover, according to an exemplary embodiment, the overall size of ventilation apertures 256 may increase progressively from a central axis of motor shaft 206 or the axial direction A toward peripheral portion 252. According to the illustrated embodiment, peripheral portion 252 defines a plurality of ventilation apertures 256 that are spaced apart along the circumferential direction C.

Referring now specifically to FIGS. 4 through 8, exemplary cooling fans 242 will be described according to exemplary embodiments of the present subject matter. Although two exemplary embodiments of cooling fan 242 are described, it should be appreciated that features of these cooling fans 242 may be interchangeable and variable in order to form still other embodiments the present subject matter. In addition, although specific sizes, geometrical relationships, and fan configurations of cooling fans 242 are described, it should be appreciated that variations and modifications may be made to cooling fans 242 while remaining within the scope of the present subject matter. In addition, although cooling fans 242 are described as being used with motor assembly 200 and washing machine appliance 100, it should be appreciated that aspects of the present subject matter apply equally to the other washing machine appliances and/or motor assemblies.

As illustrated, cooling fan 242 generally includes a plurality of blades 264 that extend outward along the radial direction R from a central hub 266. Specifically, according to the illustrated embodiment, central hub 266 may include a keyed aperture 268 that is configured for receiving motor shaft 206 such that cooling fan 242 rotates along with drive motor 204. In addition, according to the illustrated embodiment, drive pulley 212 is integrally formed within or defined by central hub 266. In this manner, blades 264 and drive pulley 212 rotate at the same speed and drive motor 204 may transmit torque directly to input shaft 214 of transmission assembly 210. Although drive pulley 212 is illustrated as being integrally formed with central hub 266, it should be appreciated that according to alternative embodiments, drive pulley 212 may be mechanically coupled to the central hub 266 and any other suitable manner.

As shown, cooling fan 242 further includes an annular plate 270 that extends from central hub 266 in a plane perpendicular to the axial direction A. As best shown in FIG. 4, blades 264 are generally positioned immediately adjacent drive motor 204, e.g., to improve heat transfer away from drive motor 204. In addition, drive pulley 212 is generally positioned at a distal end of the motor shaft 206. In this manner, blades 264 are generally positioned between drive motor 204 and annular plate 270 along the axial direction A. In addition, annular plate 270 is positioned between blades 264 and drive pulley 212 along the axial direction A.

According to the illustrated embodiment, blades 264 are spaced circumferentially about the annular plate 270 and extend toward drive motor 204 along the axial direction A. According to the illustrated embodiment, each plate 264 extends substantially straight outward along the radial direction R. However, it should be appreciated that according to alternative embodiments, blades 264 may have any other suitable profile along the radial direction R, such as being curved at any other suitable angle or having any other suitable geometry.

In addition, it should be appreciated that annular plate 270 may have any other suitable profile or airflow features. For example, annular plate 270 is illustrated as a substantially circular disc in FIGS. 5 through 7. However, according to an alternative embodiment illustrated in FIG. 8, annular plate 270 may define a scalloped profile 272 or radial recesses at a distal end 274 of blades 264. In addition, annular plate 270 is illustrated as a solid disc, but could have any suitable number of apertures or airflow features according to alternative embodiments. These features may improve the airflow generated by cooling fan 242.

Notably, the space available between drive motor 204 and fan cover 244 is very limited. As such, conventional fan configurations include blades that are straight and have a constant, small height or thickness. Notably, such blades are relatively inefficient at moving air and cooling drive motor 204. As a result, aspects of the present subject matter are directed to blade geometries and fan configurations which improve the air flow generated by cooling fan 242 and improve the thermal efficiency of fan assembly 240. For example, according to the illustrated embodiment, blades 264 generally have a geometry that varies along the axial direction A to follow a contour of an external surface, e.g., a bottom surface 218, of drive motor 204. Specifically, as illustrated, a bottom edge 280 of blades 264 may be substantially straight as they extend along annular plate 270. However, a top edge 282 of blades 264 may vary along the axial direction A to define a varying blade thickness measured along the axial direction A, as identified generally by reference numeral 284. According to exemplary embodiments, top edge 282 blades 264 may have a substantially identical profile to the bottom surface 218 of drive motor 204 and may be spaced apart from bottom surface 218 by a small air gap to generate increased air flow rates.

Specifically, as illustrated, blade thickness 284 of each of blades 264 may increase progressively toward an outer circumference of cooling fan 242, e.g., as defined by distal end 274 of blades 264. According to exemplary embodiments, this progressive increase in blade thickness 284 may be substantially constant, linear, parabolic, or may simply track bottom surface 218 of drive motor 204. According to the illustrated embodiment, each of fan blades 264 is three tiered. In this regard, each fan blade 264 may have a connecting portion 286 that extends directly from central hub 266. In addition, each blade 264 may include an inner portion 288 and an outer portion 290, as identified generally by dotted lines in FIG. 7.

As illustrated, inner portion 288 is positioned between connecting portion 286 and outer portion 290 along the radial direction R. According to exemplary embodiments, as illustrated for example in FIG. 4, fan blades 264 may be positioned above or otherwise overlap a bottom edge or surface 218 of drive motor 204 along the axial direction A. In this regard, outer portion 290 of blades 264 have at least a portion that extends above or wraps around a bottom surface 218 of drive motor 204. In this manner, fan blades 264 may cover a larger volume of the space within fan cover 244 for generating improved airflow.

Figure 7:
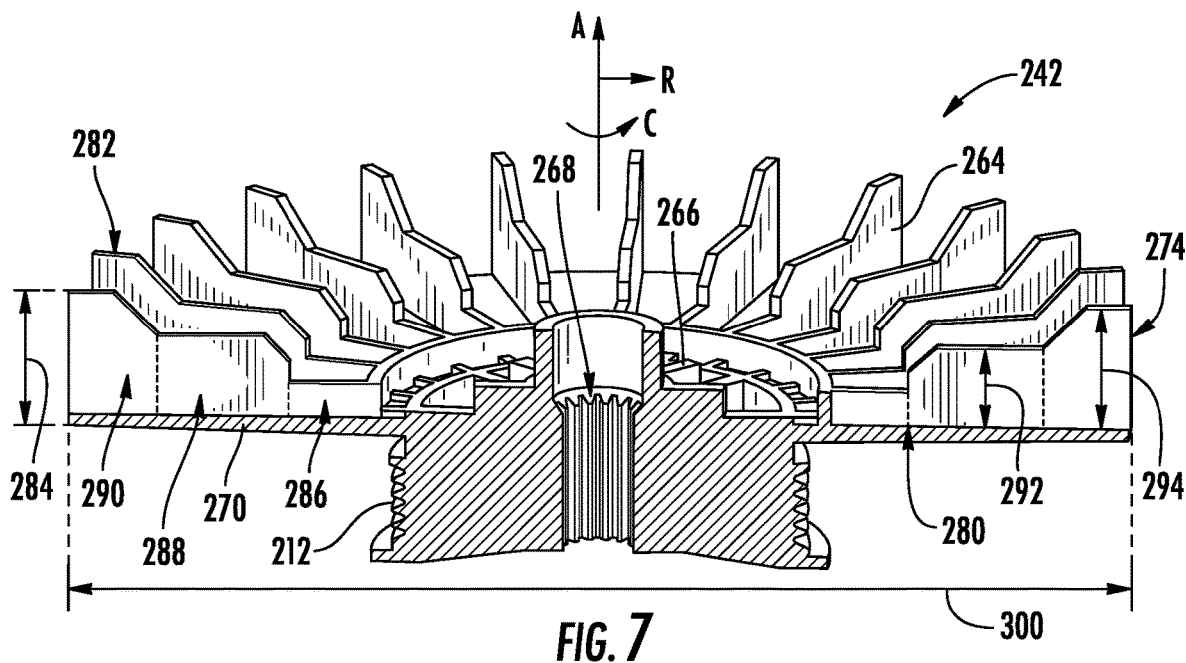
FIG. 7 provides a perspective, cross-sectional view of the exemplary cooling fan of FIG. 5 according to an exemplary embodiment of the present subject matter.
Figure 8:
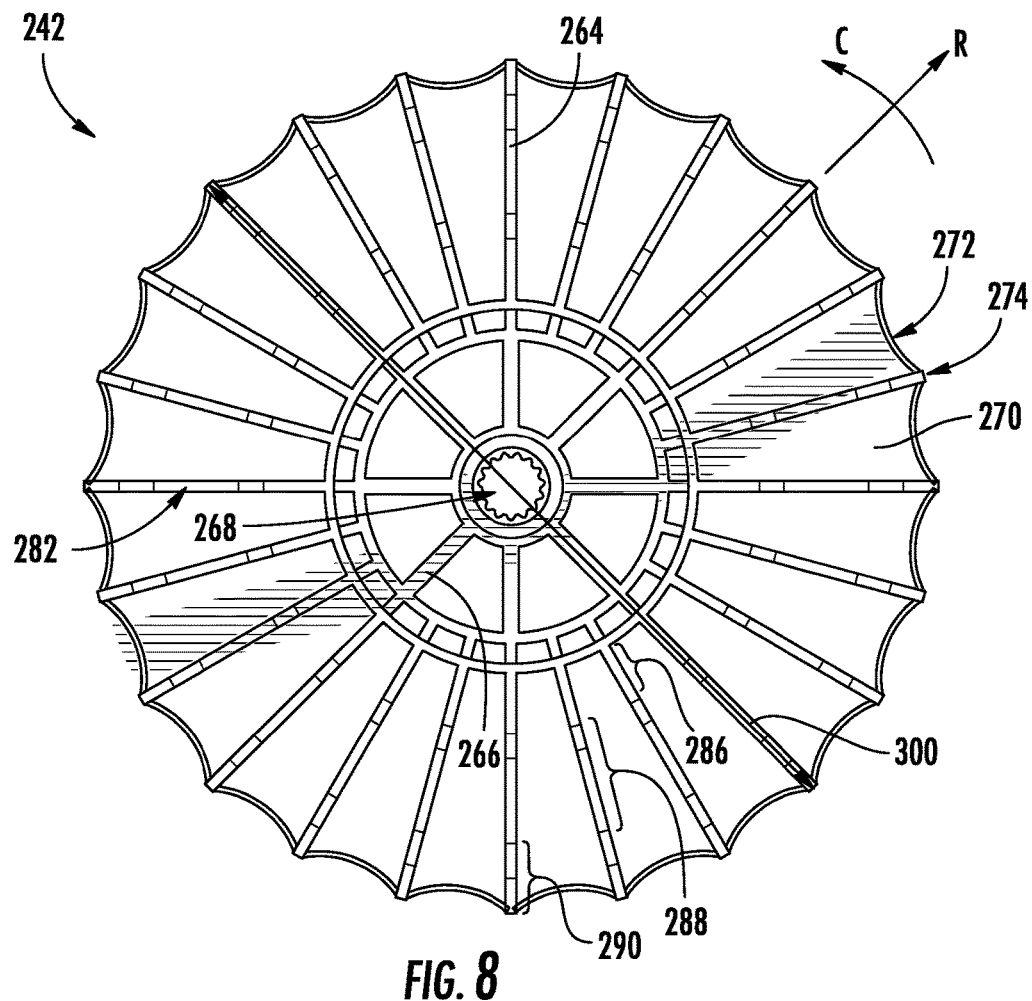
FIG. 8 provides a top view of a cooling fan that may be used with the exemplary motor assembly of FIG. 4 according to another exemplary embodiment of the present subject matter.

Referring now specifically to FIG. 7, inner portion 288 may define an average inner thickness 292 and outer portion 290 may define an average outer thickness 294. In general, average outer thickness 294 is greater than average inner thickness 292. More specifically, according to exemplary embodiments, each fan blade 264 may define a thickness ratio of the average outer thickness 294 over the average inner thickness 292. According to exemplary embodiments, the thickness ratio is between about 1 and 10, between about 1.1 and 5, between about 1.3 and 4, between about 1.5 and 3, or about 2. Other suitable thickness ratios are possible and within the scope of the present subject matter.

In addition, according to exemplary embodiments, cooling fan 242 may define a fan diameter 300. According to exemplary embodiments, cooling fan 242 defines an inner ratio that is equal to a fan diameter 300 divided by the average inner thickness 292. According to exemplary embodiments, this inner ratio is between about 5 and 12, between about 6 and 10, or about 8.5. Similarly, cooling fan 242 may define an outer ratio equal to fan diameter 300 divided by the average outer thickness 294. According to exemplary embodiments, the outer ratio is between about 8 and 20, between about 10 and 15, or about 13. Other suitable inner and outer ratios are possible and within the scope of the present subject matter.

In addition, each of the plurality of blades 264 may define an inner blade area and an outer blade area. In this regard, referring again to FIG. 7, the inner and outer blade area are those areas illustrated by the dotted lines surrounding the inner portion 288 and outer portion 290, respectively. According to exemplary embodiments of the present subject matter, each blade 264 may define an area ratio of the outer blade area to the inner blade area. According to exemplary embodiments, the area ratio is 1:1, 1.5:1, 2:1, or greater.

Referring again to FIG. 4, drive motor 204 may generally define a motor diameter 302 (measured along a radial direction R) and a motor height 304 (measured along an axial direction A). In addition, motor assembly 200 may include an assembly height 306 is equal to the motor height 304 plus a height of fan assembly 240. According to exemplary embodiments of the present subject matter, a ratio of a motor diameter 302 to a fan diameter 300 is about 1.2:1, 1.4:1, 1.8:1, 2:1, 3:1, or greater. In addition, according to exemplary embodiments, a ratio of the assembly height 306 to motor height 304 may be about 1.5:1, 1.3:1, 1.2:1, 1.1:1, or less. Other suitable diameter ratios and height ratios are possible and within the scope of the present subject matter.

The motor assembly described above facilitates reduced temperature operation of the motor assembly throughout various operating cycles of a washing machine appliance. In this regard, the integral fan directs air flow away from the motor, thereby discharging heated air and cooling components proximate motor assembly. This in turn reduces or eliminates restrictions on the operating envelope of the motor assembly for improved power, performance, and efficiency. Moreover, reduced temperature operation results in prolonged life of the motor, fewer maintenance visits and replacement parts, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A washing machine appliance comprising:
   a cabinet;
   a wash tub positioned within the cabinet and defining a wash chamber;
   a wash basket rotatably mounted within the wash tub for receiving of a load of articles for washing;
   an agitation element rotatably mounted within the wash basket; and
   a motor assembly operably coupled to the wash basket and the agitation element for selectively rotating the wash basket and the agitation element, the motor assembly comprising:
   a drive motor having a motor shaft defining an axial direction, wherein the drive motor defines a footprint in a plane perpendicular to the axial direction;
   a transmission assembly operably coupled to the wash basket and the agitation element for transmitting torque from the motor shaft to the wash basket and the agitation element; and
   a cooling fan mechanically coupled to the motor shaft for urging a flow of air as the drive motor rotates the motor shaft, the cooling fan comprising a plurality of blades, wherein the plurality of blades have a geometry that varies along the axial direction to follow a contour of an external surface of the drive motor within the footprint of the drive motor.

2. The washing machine appliance of claim 1, wherein the cooling fan defines an inner portion and an outer portion, the outer portion surrounding the inner portion along the radial direction, wherein the inner portion defines an average inner thickness and the outer portion defines an average outer thickness, the outer thickness being greater than the inner thickness.

3. The washing machine appliance of claim 2, wherein a thickness ratio of the average outer thickness divided by the average inner thickness is between about 1.5 and 3.

4. The washing machine of claim 2, wherein each of the plurality of blades defines an inner blade area of the inner portion, each of the plurality of blades defines an outer blade area of the outer portion, and wherein an area ratio of the outer blade area to the inner blade area is 1:1 or greater.

5. The washing machine appliance of claim 1, wherein a blade thickness of each of the plurality of blades increases progressively to an outer circumference of the cooling fan.

6. The washing machine appliance of claim 1, wherein the cooling fan comprises:
   a central hub mounted to the motor shaft; and
   an annular plate mounted to the central hub, wherein the plurality of blades are spaced circumferentially about the annular plate.

7. The washing machine appliance of claim 6, wherein the plurality of blades is positioned between the annular plate and the drive motor.

8. The washing machine appliance of claim 6, wherein the annular plate is a solid plate having scalloped profile defined between a distal end of each of the plurality of blades.

9. The washing machine appliance of claim 1, wherein each of the plurality of blades extends straight along the radial direction.

10. The washing machine appliance of claim 1, wherein each of the plurality of blades is curved relative to the radial direction.

11. The washing machine appliance of claim 1, wherein the cooling fan defines an inner ratio equal to a fan diameter divided by an average inner thickness, the inner ratio being less than 8.5.

12. The washing machine appliance of claim 1, wherein the cooling fan defines an outer ratio equal to a fan diameter divided by an average outer thickness, the outer ratio being less than 13.

13. The washing machine appliance of claim 1, wherein a ratio of a motor diameter to a fan diameter is 1.2:1 or greater.

14. The washing machine appliance of claim 1, wherein a ratio of a height of the motor assembly to a height of the drive motor is 1.2:1 or less.

15. The washing machine appliance of claim 1, wherein a top edge of the fan blade is positioned above a bottom edge of the drive motor along the axial direction.

16. The washing machine appliance of claim 1, wherein each of the plurality of fan blades is three tiered.

17. The washing machine appliance of claim 1, wherein the drive motor is vertically oriented such that the axial direction corresponds to a vertical direction of the washing machine appliance.

18. The washing machine appliance of claim 1, wherein a central hub defines a drive pulley for transmitting torque to the wash basket and the agitation element, the plurality of fan blades being positioned between the drive pulley and the drive motor along the axial direction.

19. A motor assembly for a washing machine appliance, the washing machine appliance comprising a wash basket rotatably mounted within a wash tub for receiving of a load of articles for washing and an agitation element rotatably mounted within the wash basket, the motor assembly comprising:

a drive motor having a motor shaft defining an axial direction, wherein the drive motor defines a footprint in a plane perpendicular to the axial direction;

a transmission assembly operably coupled to the wash basket and the agitation element for transmitting torque from the motor shaft to the wash basket and the agitation element; and a cooling fan mechanically coupled to the motor shaft for urging a flow of air as the drive motor rotates the motor shaft, the cooling fan comprising a plurality of blades, wherein the plurality of blades have a geometry that varies along the axial direction to follow a contour of an external surface of the drive motor within the footprint of the drive motor.

20. The motor assembly of claim 19, wherein a ratio of a height of the motor assembly to a height of the drive motor is 1.2:1 or less.

* * * * *